March 15, 1966     G. V. WOODLEY     3,241,053
SATURABLE REACTOR REGULATED POWER SUPPLY
Filed June 21, 1962     2 Sheets-Sheet 1

INVENTOR
GEORGE V. WOODLEY
BY
*Robertson & Smythe*
ATTORNEYS

March 15, 1966    G. V. WOODLEY    3,241,053
SATURABLE REACTOR REGULATED POWER SUPPLY
Filed June 21, 1962    2 Sheets-Sheet 2

INVENTOR
GEORGE V. WOODLEY
BY
Robertson and Smythe
ATTORNEYS

United States Patent Office 3,241,053
Patented Mar. 15, 1966

3,241,053
SATURABLE REACTOR REGULATED POWER SUPPLY
George V. Woodley, Quincy, Mass., assignor to Basic Products Corporation, Milwaukee, Wis., a corporation of Wisconsin
Filed June 21, 1962, Ser. No. 204,158
9 Claims. (Cl. 323—89)

This invention relates to electric regulators and particularly to a constant current regulator arrangement.

In systems such as airport lighting arrangements, it is necessary to keep current constant at any selected value thereof. Variations and unwanted transients may deleteriously affect and damage the lamps. This also is true in other similar systems where the current, voltage or power must be kept constant. Additionally, the current or other condition sensing means in prior systems has not provided a true measure of the R.M.S. or effective current, so that it was never certain that the true current to the lamp actually was being measured. If the current is sinusoidal, then it can be measured, but when it is distorted, such as where saturable reactors are employed, difficult control problems result. It is desirable to use static equipment such as saturable reactors where possible. Further, the load current response must be fast and restored quickly when there are changes in line voltage or load.

One of the objects of the invention is to provide a regulator system having fast transient response.

Another of the objects of the invention is to provide an arrangement wherein the true current, or other condition, to the load is employed for operating a static controller.

In one aspect of the invention, a source of A.C. is connected to the circuit, and a power modulator such as a saturable reactor is provided in the circuit between the input and output thereof. A transformer or equivalent means is provided in the output circuit to obtain an A.C. signal proportional to the output. A conversion means, preferably a Hall effect device, receives the proportional A.C. output signal and provides a D.C. signal whose value is a measure of the effective value of the output current such as the R.M.S. value. A reference signal source is connected to a summation or comparison means to which a signal from the conversion means also is connected. Amplifier means then receives the summation or compared signal and feeds it to a control means.

In the preferred form, a second harmonic type modulator is employed for receiving the signal from the Hall effect device and controlling a unijunction transistor which in turn controls a silicon controlled rectifier bridge or means. The silicon controlled rectifier bridge can be connected to the control windings of a saturable reactor means located in the circuit between the A.C. input and the A.C. output to the load. As mentioned, the load may be the lamps of an airport lighting system. In order to change the level of brightness of the lamps, it is merely necessary to change the reference signal as desired.

These and other objects, advantages and features of the invention will become apparent from the following description and drawings which are merely exemplary.

The invention will be described in conjunction with its use as a constant current regulator, but it is to be understood that the principles could be used to maintain constant voltage, power, temperature or other characteristics transferable into an electric signal.

Figure 1:
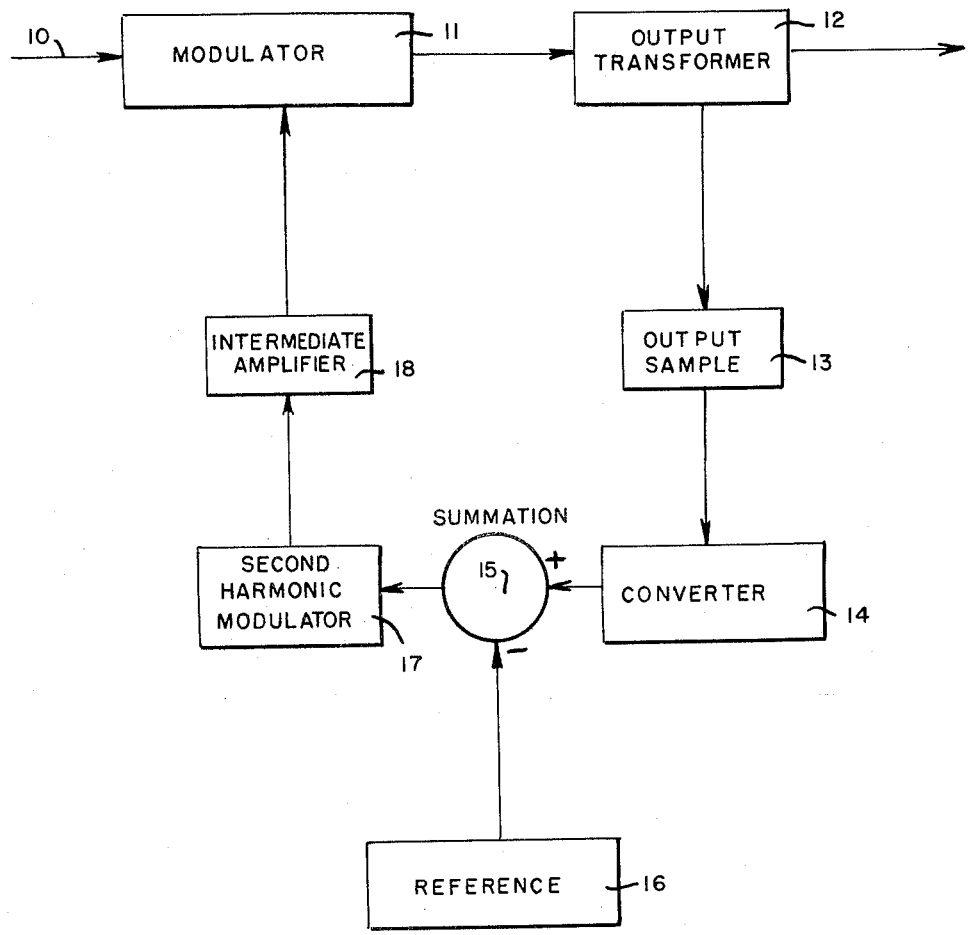
FIG. 1 is a block diagram showing the general arrangement of the invention.

Referring to FIG. 1, the source 10 of A.C. input power is fed through saturable reactor means 11 which is connected to output transformer 12. A sample signal is obtained from the output circuit by a transformer means 13 which provides a signal which is the load current or voltage signal. A conversion means 14, preferably a Hall effect device, provides a D.C. signal which is the measure of the effective value of the output current or voltage. A summation or comparison means 15 is connected with said output signal and a reference or comparison signal source 16. The composite signal is fed to a signal amplifier 17 which may be of the second harmonic modulator type. The signal amplifier is connected with the intermediate amplifier 18 which is of the silicon controlled rectifier type. This, in turn, is connected to the control means of the power modulator which can be a saturable reactor means.

Figure 2:
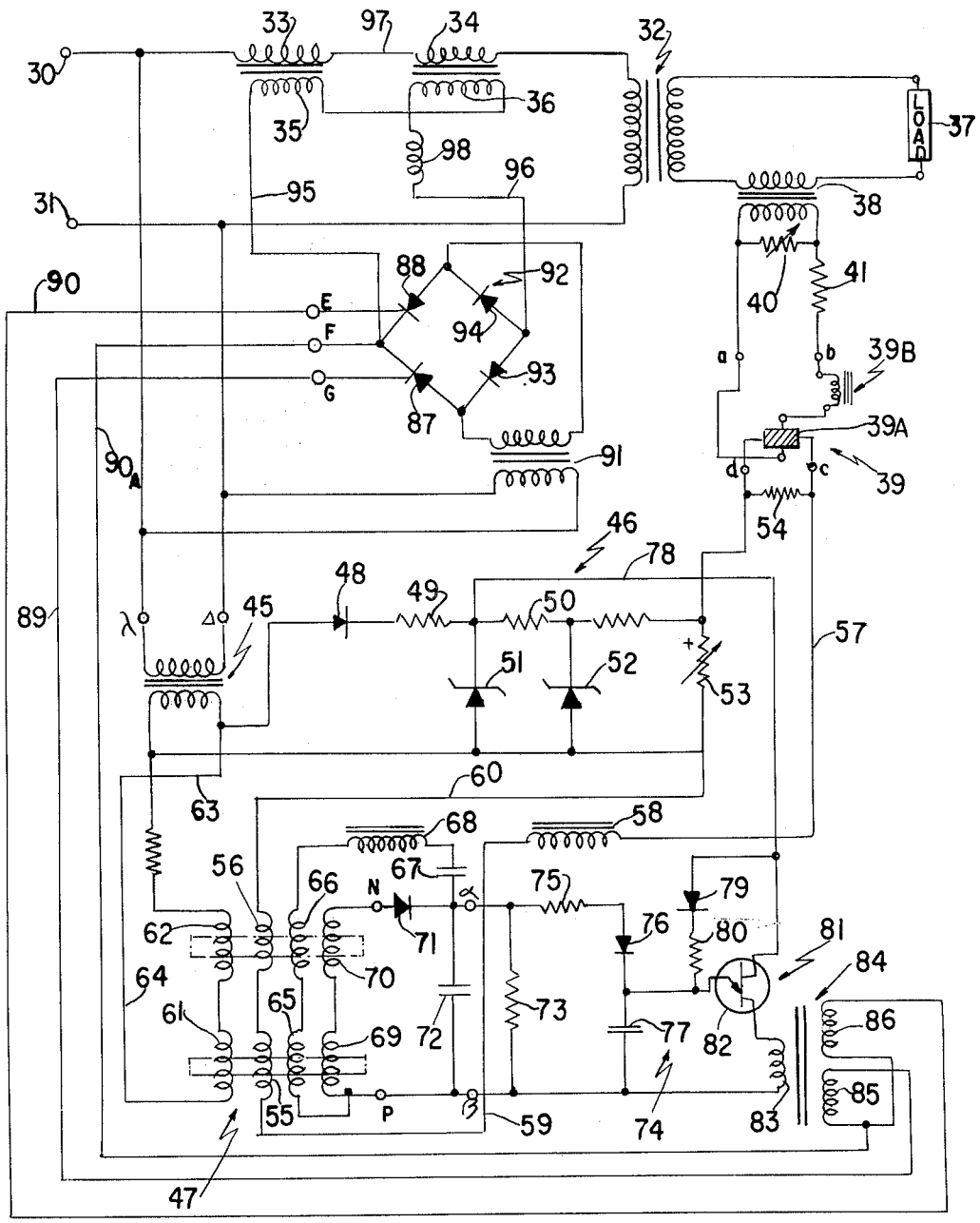
FIG. 2 is a circuit diagram of one form of the invention.

FIG. 2 shows power input at 30, 31, lead 30 being connected to output transformer 32 through saturable reactor load or gate windings 33, 34, the saturable reactors having control windings 35, 36, respectively. The control windings have D.C. fed thereto, as will be described hereafter. Load 37 has a transformer 38 in its feed circuit for feeding a Hall effect device designated generally by 39. As is known, the Hall effect device 39 may feed a wafer 39A and a magnetic circuit with an air gap 39B (not shown) into which the wafer is inserted. Transformer 45 supplies the voltage to operate the reference supply, generally indicated at 46, and the voltage to operate the second harmonic modulator, generally indicated at 47. In the reference supply, rectifier 48 provides unregulated reference voltage which is further filtered and regulated by the network including resistors 49, 50 and Zener diodes 51, 52, such providing a reference voltage across adjustable resistor 53. The reference voltage can be varied by varying resistor 53. The reference voltage appearing across resistor 53 is compared with the output of the Hall effect device which appears across resistor 54. Such will produce a net difference voltage which is applied to the control windings 55, 56 of second harmonic modulator 47, such being supplied through lead 57, choke 58, lead 59 and return lead 60. The excitation windings of second harmonic modulator 47 are 61, 62 as supplied from transformer 45 through leads 63 and 64.

Second harmonic modulator 47 has anti-hunt feedback windings 65, 66 which are connected to the output of the second harmonic modulator through capacitor 67 and inductor 68. The second harmonic modulator has output windings 69, 70. The output of second harmonic modulator 47 is rectified by means of diode 71 and is filtered by means of capacitor 72. The resistor 73 provides a load for the second harmonic modulator.

The direct current output voltage of second harmonic modulator 47 is applied to the unijunction firing circuit, indicated generally by 74, through resistor 75 and diode 76. Firing circuit 74 operates by virtue of capacitor 77 being charged from the output of second harmonic modulator 47. The power for firing circuit 74 is obtained from reference power supply 46 through lead 78. Diode 79 and resistor 80 provide a bias charging current to capacitor 77. Unijunction transistor 81 is fired by the charging of capacitor 77 by means of its terminal 82 and when fired, allows a current to pass through lead 78 and through the primary windings 83 of pulse transformer 84. The secondary windings 85, 86 of pulse transformer 84 apply the pulses generated by unijunction transistor circuit 74 to the gating terminals of silicon controlled rectifiers 87, 88 by leads 89, 90, respectively. Transformer 91 supplies power to the controlled rectifier, indicated generally by 92, which includes diodes 93, 94 in addition to the controlled rectifiers 87 and 88. The output of controlled rectifier bridge 92 is applied by means of leads 95 to control windings 35 and 36 of saturable reactor means shown generally at 97. Inductor 98 is serially connected in the control circuit.

As one example of the construction of the second harmonic modulator 47, excitation windings 61 and 62 are wound individually on two cores. The input winding, the anti-hunt feedback winding and the output winding can be wound simultaneously over the two cores as one individual winding.

A silicon controlled rectifier is a device which has a cathode, anode and gate terminal, the device blocking in the forward direction until a small signal is applied to the gate. In one form it is of a PNPN structure.

The unijunction transistor has three terminals referred to as the emitter, base-one and base-two. In one form it may consist of an N silicon bar mounted between two base contacts with a P emitter near base-two. It operates by the conductivity modulation of the cut-off between the emitter and base-one when the emitter is forward biased.

It should be apparent that the device can be used for various purposes and that the intermediate amplifier can take various forms without departing from the spirit of the invention except as defined in the appended claims.

What is claimed is:

1. In an electric regulator the combination including an A.C. input and an A.C. output, power modulator means connected between said input and output, said power modulator means having control means, means for providing an A.C. signal proportional to the output, conversion means including an R.M.S. measuring means for providing a signal whose value is a measure of the effective value of the output, reference signal means, and second harmonic modulator means, connected to said signal conversion means, said reference signal means and said control means for controlling current to said output.

2. In an electric regulator the combination including an A.C. input and an A.C. output, saturable reactor means connected between said input and output, said saturable reactor means having control winding means, means for providing an A.C. signal proportional to the output, conversion means including an R.M.S. measuring means for providing a signal whose value is a measure of the effective value of the output, reference signal means, second harmonic modulator means connected to said reference signal means and to said signal conversion means to provide a summation signal, means connecting said second harmonic regulator means to an intermediate amplifier means, and means connecting said intermediate amplifier with said control winding means.

3. In an electric regulator the combination including an A.C. input and an A.C. output, saturable reactor means connected between said input and output, said saturable reactor means having control winding means, means for providing an A.C. signal proportional to the output, conversion means including an R.M.S. measuring means for providing a signal whose value is a measure of the effective value of the output, reference signal means, second harmonic modulator means connected to said reference signal means and to said signal conversion means to provide a summation signal, unijunction transistor means connected to said second harmonic modulator, a silicon controlled rectifier bridge network connected to said unijunction transistor and means connecting said silicon controlled rectifier means to said control winding means.

4. In an electric regulator the combination including an A.C. input and an A.C. output, saturable reactor means connected between said input and output, said saturable reactor means having control winding means, means for providing an A.C. signal proportional to the output, Hall effect conversion means for providing a D.C. signal whose value is a measure of the effective value of the output current, reference signal means, second harmonic modulator means connected to said reference signal means and to said conversion means to provide a summation signal, unijunction transistor means connected to said second harmonic modulator, a silicon controlled rectifier bridge network connected to said unijunction transistor and means connecting said silicon controlled rectifier means to said control winding means.

5. In an electric regulator the combination including an A.C. input and an A.C. output, saturable reactor means connected between said input and output, said saturable reactor means having control winding means, means for providing an A.C. signal proportional to the output, Hall effect conversion means for providing a D.C. signal whose value is a measure of the effective value of the output current, reference signal means, second harmonic modulator means connected to said reference signal means and to said conversion means to provide a summation signal, said second harmonic modulator means including anti-hunt windings unijunction transistor means connected to said second harmonic modulator, a silicon controlled rectifier bridge network connected to said unijunction transistor and means connecting said silicon controlled rectifier means to said control winding means.

6. In an electric regulator the combination including an A.C. input and an A.C. output, saturable reactor means connected between said input and output, said saturable reactor means having control winding means, means for providing an A.C. signal proportional to the output, Hall effect conversion means for providing a D.C. signal whose value is a measure of the effective value of the output current, reference signal means including Zener diode means, second harmonic modulator means connected to said reference signal means and to said conversion means to provide a summation signal, unijunction transistor means connected to said second harmonic modulator, a silicon controlled rectifier bridge network connected to said unijunction transistor and means connecting said silicon controlled rectifier means to said control winding means.

7. In an electric regulator the combination including an A.C. input and an A.C. output, saturable reactor means connected between said input and output, said saturable reactor means having control winding means, means for providing an A.C. signal proportional to the output, Hall effect conversion means for providing a D.C. signal whose value is a measure of the effective value of the output current, reference signal means including Zener diode means, second harmonic modulator means connected to said reference signal means and to said conversion means to provide a summation signal, said second harmonic modulator means including anti-hunt windings, unijunction transistor means connected to said second harmonic modulator, a silicon controlled rectifier bridge network connected to said unijunction transistor and means connecting said silicon controlled rectifier means to said control winding means.

8. In an electric regulator, the combination including an A.C. input, an output transformer, a saturable reactor having gate windings connected between said input and output transformer, said saturable reactor having control winding means, a current transformer in the load circuit of said output transformer, a Hall effect conversion means connected to said current transformer, second harmonic modulator means having excitation windings, control windings and output windings, reference signal means, means connecting said conversion means and reference signal means in comparison relation to the control windings of said second harmonic regulator means, unijunction transistor means connected to the output windings of said second harmonic regulator means, and silicon controlled rectifier bridge means, and means connecting said bridge means to said unijunction transistor means and to the control winding means of said saturable reactor means.

9. In an electric regulator, the combination including an A.C. input, an output transformer, a saturable reactor having gate windings connected between said input and output transformer, said saturable reactor having control winding means, a current transformer in the load circuit of said output transformer, a Hall effect conversion means connected to said current transformer, second harmonic modulator means having excitation windings, control windings, anti-hunt windings and output windings, adjustable reference signal means, means connecting said conversion means and reference signal means in comparison relation to the control windings of said second harmonic regulator means, unijunction transistor means connected to the output windings of said second harmonic regulator means, and silicon controlled rectifier bridge means, and means connecting said bridge means to said unijunction transistor means and to the control winding means of said saturable reactor means.

References Cited by the Examiner

UNITED STATES PATENTS

| | | | |
|---|---|---|---|
| 2,709,779 | 5/1955 | Bixby | 323—66 |
| 2,866,151 | 12/1958 | Applin et al. | 323—66 |
| 2,961,594 | 11/1960 | Mah | 323—66 |
| 2,987,666 | 6/1961 | Manteuffel | 323—22 |
| 3,012,187 | 12/1961 | Johnson | 323—66 |
| 3,047,789 | 7/1962 | Lowry | 323—18 |
| 3,063,001 | 11/1962 | White | 323—66 |
| 3,089,995 | 5/1963 | Kleinman et al. | 321—46 |

LLOYD McCOLLUM, *Primary Examiner.*